Figure 1:
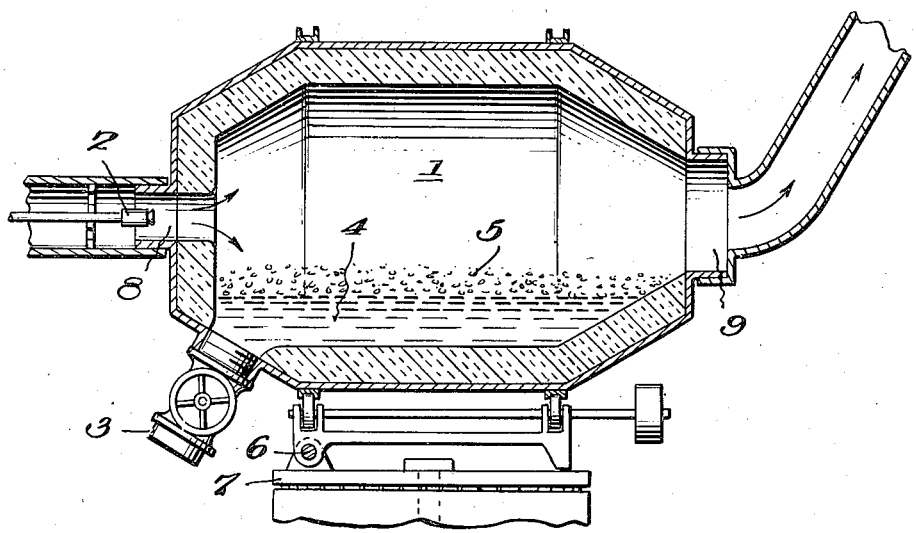

Inventors
Fritz Eulenstein,
Adolf Krus,

Patented Oct. 14, 1941

2,258,850

UNITED STATES PATENT OFFICE 2,258,850

PROCESS FOR DESULPHURIZING IRON OR IRON ALLOYS

Fritz Eulenstein, Cologne-on-the-Rhine, and Adolf Krus, Sturzelberg uber Neuss, Germany, assignors to Sachtleben Aktiengesellschaft, Cologne-on-the-Rhine, Germany Application November 21, 1939, Serial No. 305,554
In Germany October 29, 1937

12 Claims. (Cl. 75—51)

The present invention relates to an improved process for desulphurizing molten iron or iron alloys.

This application is a continuation-in-part of our application S. N. 237,308, filed October 27, 1938.

It is an object of the invention to provide a process whereby molten iron and iron alloys may be desulphurized rapidly and economically.

It is a further object of the invention to provide a process whereby molten iron and iron alloys may be desulphurized without reducing the amount of phosphorus, manganese and carbon which may be contained therein.

It is another object of the invention to provide a process whereby molten iron may be desulphurized while simultaneously reducing its content in silicon and phosphorus and other impurities.

It is a further object of the invention to provide a process whereby molten iron and iron alloys containing sulphur, silicon, phosphorus, manganese and carbon may be desulphurized without simultaneously reducing or substantially reducing its content in phosphorus, manganese and carbon while substantially reducing its content in silicon.

Iron ores, especially those which have a high content of silica, are often smelted in such a manner that an acid slag is formed thereby producing an iron containing up to 1%, and even more, of sulphur. Iron containing similar high percentages of sulphur may also result when scrap is melted down. Such, and other, kinds of iron are usually desulphurized in order to fit them for their intended purpose. The desulphurization is effected, either with the aid of manganese (for example in the mixer) or special desulphurizing processes are employed which extract the sulphur from the iron by means of basic slags. However, only such slags as contain soda have hitherto produced satisfactory results in practice. Fused lime slags are also used for desulphurizing in the Martin furnace or electric furnace. Up to the present, the general opinion of the art has been that molten slag alone can produce a satisfactory desulphurizing effect. Such processes, however, are expensive, since they involve the application of costly desulphurizing agents, such as, manganese, calcium carbide or soda, and they also take up a good deal of time.

It has now been ascertained, in accordance with the present invention, that the desulphurization of iron and iron alloys can be carried out with far greater advantages than by the known processes by performing the operation with the aid of lime in horizontal rotary furnaces or rocking furnaces in such a manner that at the working temperature the slag is present in the dry, non-fluid condition and can be discharged by tilting the furnace (preferably after tapping-off the molten metal). Because the lime is in the unmelted condition or in the form of an extremely viscid pulp, it is continuously intermingled with the molten metal by the movement of the furnace. This continuous intermingling is effected as the surfaces of the solid particles of lime apparently become coated with a thin, tacky coating of slag and adhere sufficiently to the wall of the rotary or rocking furnace which dips under the surface of the molten iron so that they are dragged under the surface of the molten iron, whereupon they are released and again float up to the surface of the molten iron.

Although no molten slag is present during the desulphurizing treatment, this special method of mixing the metal and the desulphurizing agent accelerates the desulphurizing in a highly efficient manner. The process is completed in a very short time and the resulting finished product contains 0.01%, or even less, of sulphur, especially in the case of kinds of iron containing up to, and exceeding, 1% of sulphur. The amount of lime employed is small and so is the consumption of fuel, particularly when the iron is introduced into the furnace in the molten state.

The process in accordance with the present invention may also be carried out under such conditions that, besides achieving desulphurization, any carbon silicon, manganese and phosphorus contained therein is also substantially removed. In accordance with this modification of the process the crude iron containing sulphur, carbon, silicon, manganese and phosphorus is melted down in a rotary furnace under oxidizing conditions and in the presence of lime, and then the treatment is continued after the addition of a further quantity of lime sufficient that the lime remains in a substantially dry, non-molten state during the treatment.

In accordance with another modification of the process sulphur and silicon may be removed from crude iron while not substantially reducing the quantity of carbon, manganese and phosphorus which may be contained therein. In accordance with this modification, the desulphurization is carried out in a rotary or rocking furnace with non-molten lime under a neutral or reducing flame. If coke is added to the charge, it is even possible to increase the carbon content of the iron during the treatment. Preferably, rotary or rocking furnaces are employed which are heated with powdered coal dust as coal dust heating makes it possible to obtain the greatest selective removal of silicon and sulphur from the iron treated while retaining the phosphorus, manganese and carbon which may be contained in the crude iron. It is also possible to employ furnaces heated with a gaseous fuel, but when employing such fuel a relatively stronger reducing atmosphere is available or a greater addition of coke is necessary.

During the desulphurization treatment in accordance with the present invention, care must, of course, be taken to prevent the action of the lime from being impaired by the slagging constituents, especially silica or silicon, present in the iron. Nevertheless, satisfactory desulphurizing can also be obtained even with slags containing 2.5 parts by weight of lime to 1.0 part by weight of silica. In some cases, it is advisable to increase the lime content, for example, to have a silica ratio of up to 3.5:1 and, in exceptional cases up to 5:1; preferably the proportion is at least 3 to 5 parts lime to 1 part of silica.

Rocking furnaces of known type can be employed for carrying out the hereindescribed process. These furnaces are so designed that the dry slag can be discharged, after tapping-off the iron, by tilting the furnace. Since the slag is non-fluid, large discharge openings should be provided and the interior design of the furnace should be such that the slag can actually slide down from all parts of the furnace towards the outlet.

A rotary furnace which has proved particularly suitable for carrying out the process of the present invention is one adapted to rotate about a horizontal axis and to turn on a vertical axis, being mounted, for example, on a turntable. The furnace is tiltable in such a manner that the slag, and preferably also the iron, can be emptied at one of its ends. The tilting axis is preferably located near one of the ends of the furnace, the arrangement being such that the furnace can be tilted obliquely or vertically about said axis. Rocking furnaces can, of course, be arranged to be tiltable in like manner so that the iron and the slag can be discharged at one end.

Figure 2:
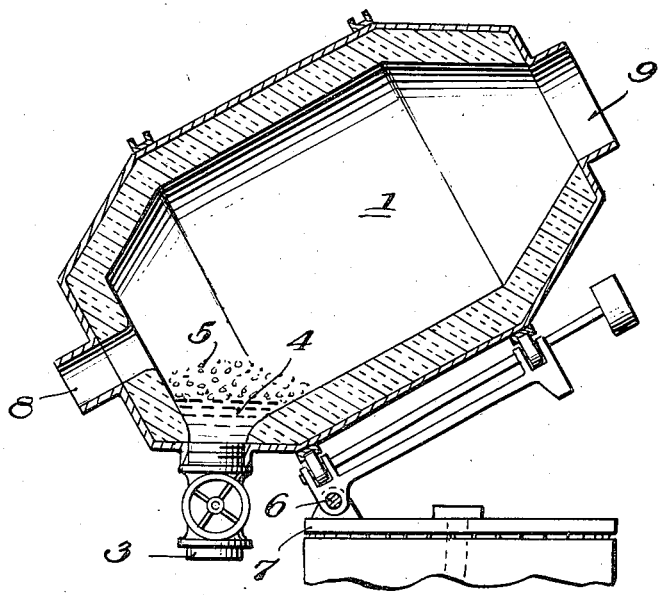

In the accompanying drawing:

Fig. 1 diagrammatically shows a longitudinal section of a rotary or rocking furnace suitable for carrying out the present process in operating position; and Fig. 2 diagrammatically shows a longitudinal section of the drum of the furnace in position for discharging the products of the process.

Referring to the accompanying drawing, 1 represents the drum of a horizontal rotary or rocking furnace which is charged with molten iron 4 and the non-molten granular lime 5. The furnace is heated by the pulverized coal burner 2. The outlet 3 is the outlet through which the molten iron and non-molten lime slag resulting at the end of the process are, respectively, drawn off after tilting the drum of the furnace about the axis 6 in the manner shown in Fig. 2, by means known per se. The turntable 7 aids in charging and discharging the furnace. The molten iron and the non-molten slag may be drawn off through the opening 8 or 9 in the end sides of the furnace. The outlet 3 may then be dispensed with. The openings in the end-sides of the furnace may also be used for charging the furnace.

The following examples are given to illustrate the present invention, but the invention is in no way limtied thereto:

Example I

Ten tons of iron were melted down in the herein-described rotary furnace. The molten iron contained about 4.5% of C, 0.3% of Mn, 0.015% of Si, 0.02% of P and 0.4% of S. After the iron had melted, 500 kgs. of subdivided burnt lime were added, while the furnace was rotating. The furnace was heated by pulverized-coal burners, with air preheated to about 500° C. In order to prevent losses of carbon during the melting process, 500 kgs. of coke breeze were added to the charge. During the rotation of the furnace, the iron flowed continuously over the dry and subsequently viscid lime slag. After about an hour, the iron was run off under the layer of slag, the latter being subsequently discharged by tilting the furnace at a steeper angle. The resulting iron had the following composition:

| | Per cent |
|---|---|
| C | 4.16 |
| P | 0.015 |
| Mn | 0.3 |
| Si | 0.015 |
| S | 0.010 |

Remainder iron.

The composition of the slag was:

| | Per cent |
|---|---|
| Fe | 6.2 |
| CaO | 55.6 |
| MgO | 4.4 |
| SiO$_2$ | 22.0 |
| Al$_2$O$_3$ | 6.0 |
| S | 3.65 |

Example II

The same quantity of the same iron was introduced in a molten state into the furnace, the latter having been previously charged with the same amount of burnt lime as in Example I, and 300 kgs. of coke breeze. The burner was adjusted to furnish a neutral flame. The desulphurization took place in the same manner and in about the same time, as in Example I. The iron and slag also had approximately the same composition, with the difference that the carbon content of the iron was slightly larger, being 4.7%.

The lime and carbon may, of course, also be added after the charge of molten iron.

Example III

Pig iron containing 0.7% of P, 0.35% of S and 0.8% of Si was melted down by an oxidizing flame in the drum furnace with an addition of lime. Combined with the melting down was a powerful fining action resulting in lowering the carbon content to 0.08% and a similar extensive elimination of phosphorus and silicon. The desulphurizing then proceeded in the aforedescribed manner after a further addition of 600 kgs. of burnt lime. The resulting iron contained:

| | Per cent |
|---|---|
| C | 0.05 |
| Si | 0.02 |
| P | 0.05 |
| S | 0.006 |

Remainder iron.

If, preferably after the desulphurization, bon, such as, coke breeze o to the charge, the carbon content of this iron can be restored to 4.5% to 4.8% without increasing the content of phosphorus, silicon and sulphur. This method of carrying out the invention leads, therefore, to the production of a high-grade, special iron equal to Swedish charcoal iron by employing inferior kinds of iron as starting materials.

*Example IV*

60 tons of raw iron of the following composition: 3.71% of C, 0.82% of Si, 0.42% of Mn, 1.80% of P, 0.168% of S, and the remainder iron, which had been preheated to a temperature of about 1250° C., an amount of granulated lime corresponding to 3.0 tons of CaO and 1500 coke were introduced into a rotary furnace which had been preheated to 1300° C. The rotary furnace was heated directly with a coal dust burner. The iron was treated in the furnace for about one hour while continuously rotating such furnace. The furnace was heated to a temperature of about 1350° C. The lime and thereafter the coke breeze were put into the furnace before the iron was changed.

The resultant iron had the following analysis:

| | Percent |
|---|---|
| C | 4.01 |
| Si | 0.21 |
| Mn | 0.40 |
| P | 1.76 |
| S | 0.035 |

Remainder iron.

After a two hour treatment employing the same crude iron and the same conditions for the process, the resultant iron had the following analysis:

| | Percent |
|---|---|
| C | 4.19 |
| Si | 0.05 |
| Mn | 0.40 |
| P | 1.70 |
| S | 0.016 |

The temperature at the end of the process was about 1400° C. to 1500° C. In both cases the iron obtained could be blown very easily in a converter with very little spattering and a high recovery of iron was gained. The slag which was obtained contained only very little iron and was excellent for the preparation of cement because of its high lime content. The rotary furnace was heated with coal dust and the amount of combustion air introduced was adjusted so that it amounted to seven to eight times the weight of the coal dust. This amount is sufficient to effect complete combustion of the coal dust with no excess of air. The effluent gases contained about 4.2% of carbon monoxide.

In the claims the term "rotary furnace" is intended to mean a rocking furnace wherein the direction of rotation of the furnace is changed periodically, as well as a rotary furnace wherein the direction of rotation remains unchanged.

While we have described herein some embodiments of our invention, we wish it to be known that we do not intend to limit ourselves thereby except within the scope of the appended claims.

We claim:

1. A process for desulphurizing iron and iron alloys comprising treating such metal in the molten state in a horizontal rotary furnace with a substantially dry, non-molten material mainly comprising lime and containing a sufficient amount of lime that such material remains substantially dry and non-molten during the entire treatment, and during such treatment heating the metal directly with combustion gases.

2. A process for refining iron and iron alloys comprising treating such metals in the molten state under oxidizing conditions in a horizontal rotary furnace with a substantially dry, non-molten material mainly comprising lime and containing a sufficient amount of lime that such material remains substantially dry and non-molten during the entire treatment.

3. A process for refining iron and iron alloys comprising melting down such metal in a horizontal rotary furnace under oxidizing conditions and in the presence of lime, and then continuing the treatment after adding a sufficient quantity of lime that such lime remains in a substantially dry, non-molten state during such treatment.

4. A process for desulphurizing iron and iron alloys comprising tumbling such metal in the molten state with a substantially dry, non-molten material mainly comprising lime under a non-oxidizing flame, said material containing a sufficient amount of lime that such material remains substantially dry and non-molten during the entire treatment.

5. A process for desulphurizing iron and iron alloys comprising treating such metal in a molten state in a horizontal rotary furace under a non-oxidizing flame of a powdered coal burner with a substantially dry, non-molten material mainly comprising lime and containing a sufficient amount of lime that such material remains substantially dry and non-molten during the entire treatment.

6. A process for desulphurizing iron and iron alloys comprising treating such metal in a molten state in a horizontal rotary furnace under a neutral flame of a powdered coal burner with a substantially dry, non-molten material mainly comprising lime and containing a sufficient amount of lime that such material remains substantially dry and non-molten during the entire treatment.

7. A process for desulphurizing iron and iron alloys comprising treating such metal in a molten state in a horizontal rotary furnace under a reducing flame of a powdered coal burner with a substantially dry, non-molten material mainly comprising lime and containing a sufficient amount of lime that such material remains substantially dry and non-molten during the entire treatment.

8. A process for desulphurizing iron and iron alloys comprising treating such metal in a molten state in a horizontal rotary furnace under a non-oxidizing flame with a substantially dry, non-molten material containing a sufficient amount of lime that such material after the desulphurization contains at least 2.5 parts by weight of lime to 1.0 part by weight of such silica as may be present in such material during the desulphurization and sufficient that such material remains substantially dry and non-molten during the entire treatment.

9. A process for refining iron and iron alloys containing sulphur, silicon, phosphorus and carbon to remove sulphur and silicon therefrom while retaining the phosphorus and carbon, comprising treating such metal in the molten state in a horizontal rotary furnace under a non-oxidizing flame of a coal dust burner with a substantially dry, non-molten material containing a sufficient amount of lime and reducing carbon that such material after the treatment contains at least 2.5 parts by weight of lime to 1.0 part by weight of such silica as may be present in such material during the treatment and sufficient that such material remains substantially dry and non-molten during the entire treatment.

10. A process as set forth in claim 9 wherein the reducing carbon is coke breeze.

11. A process for refining iron and iron alloys containing sulphur, silicon, phosphorus and carbon to remove sulphur and silicon therefrom while retaining the phosphorus and carbon, comprising treating such metal in the molten state in a horizontal rotary furnace under a reducing flame of a coal dust burner with a substantially dry, non-molten material containing a sufficient amount of lime and reducing carbon that such material after the treatment, the amount of lime present in such material being sufficient that such material remains substantially dry and non-molten during the entire treatment contains at least 2.5 parts by weight of lime to 1.0 part by weight of such silica as may be present in such material during the treatment.

12. A process for desulfurizing iron and iron alloys comprising treating such metal in the molten state in a horizontal, rotating, rotary furnace with a substantially dry, non-molten material essentially comprising lime and containing a sufficient amount of lime that such material after the desulfurization contains at least about 2.5 parts by weight of lime and 1.0 part by weight of such silica as may be present in such material during such desulfurization and sufficient that such material remains substantially dry and non-molten during the entire treatment, and during such treatment heating the metal directly by the combustion gases of a burner.

FRITZ EULENSTEIN.
ADOLF KRUS.